United States Patent Office 3,525,903
Patented Aug. 25, 1970

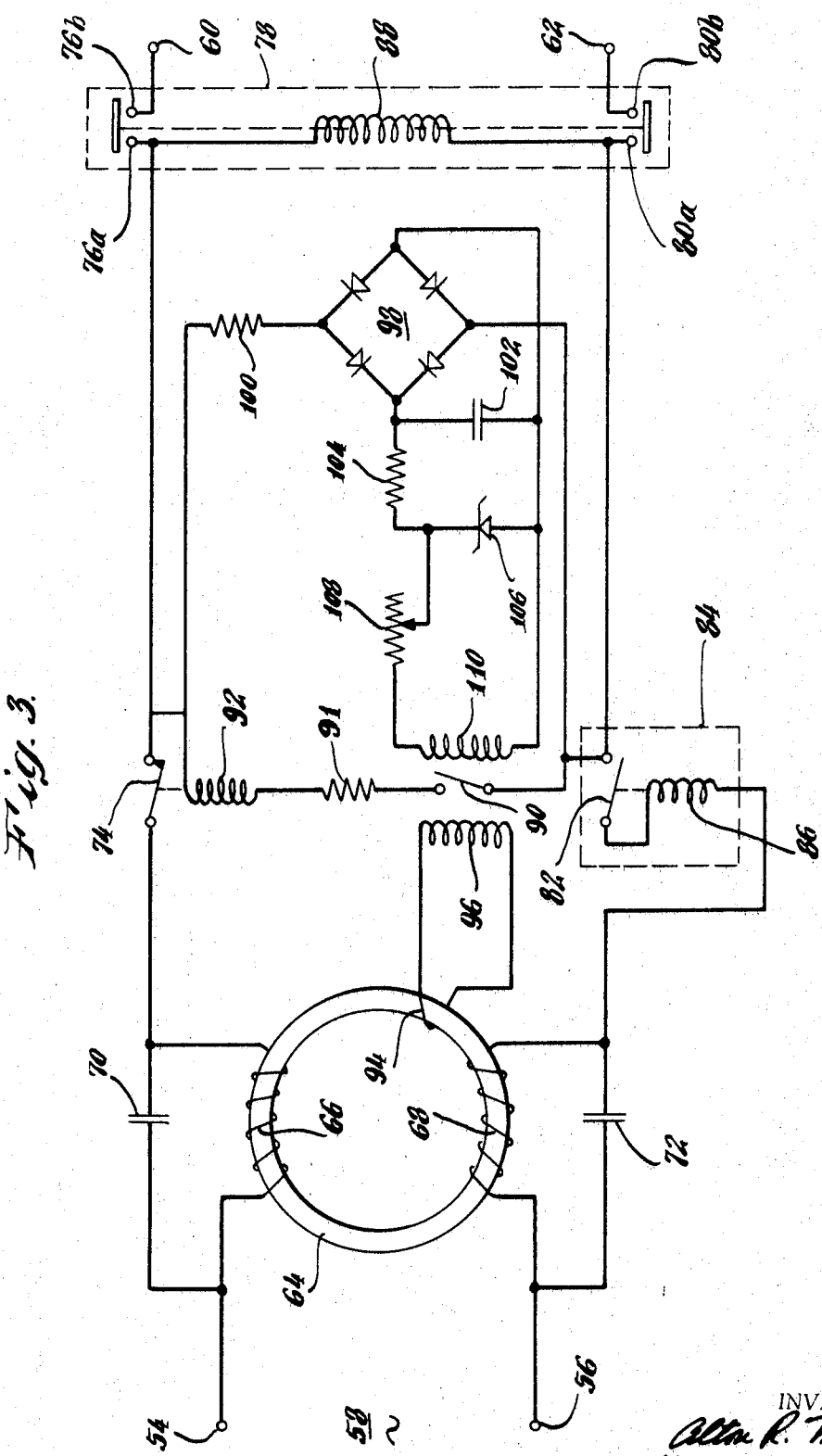

3,525,903
REED RELAY WITH ELECTROMAGNETIC BIASING
Alton R. Morris, Trumbull, and Thomas M. McDonald, Monroe, Conn., assignors to Harvey Hubbell Incorporated, Bridgeport, Conn., a corporation of Connecticut
Filed Oct. 18, 1967, Ser. No. 676,099
Int. Cl. H02h 3/28; H01h 47/00
U.S. Cl. 317—18                                14 Claims

ABSTRACT OF THE DISCLOSURE

The differential transformer of a ground fault current interrupter has its secondary winding positioned to actuate a highly sensitive reed relay through an operating coil. The reed relay, in turn, operates a power relay which disconnects the load. The sensitivity of the reed relay is increased by means of a biasing coil which is energized from the power supply through a biasing circuit for sensitizing, but not closing, the reed relay. Upon occurrence of a ground fault, the current in the operating coil increases the total field acting upon the reed sufficiently to close the relay.

BACKGROUND OF THE INVENTION

This invention relates to a read relay having electromagnetic biasing and, more particularly, to such a relay in ground fault current interrupters.

An electrical safety device which is currently undergoing considerable development activity is the ground fault current interrupter. These devices are of substantial importance because their primary function is to save human life rather than to protect equipment, as is true of most previous "safety" devices. The typical ground fault current interrupter employs a differential transformer havings windings connected in the power supply lines. These windings are so disposed that when the currents in the supply lines are equal, equal and opposite magnetic fields are produced in the transformer core. These fields cancel each other so that no resultant magnetic field is present. A secondary winding is also mounted on the same core and is connected to activate a tripping circuit. In the event of a ground on the load circuit, an unbalance will exist in the currents flowing through the power supply conductors due to the existence of ground leakage. This, in turn, is reflected in the production of a resultant magnetic field in the core. The resultant field energizes the secondary winding which thereupon trips a relay, opening the power supply conductors.

In one type of ground fault current interrupter known to the prior art, the secondary winding of the differential transformer is connected to an electromagnetic "operating coil" which is placed in proximity to a highly sensitive reed relay. The sensitivity of the relay is increased, and the relay is caused to remain latched, by means of a permanent "biasing" magnet which is also placed in proximity to the reed relay. Upon the occurrence of a fault, the sum of (1) the steady state magnetic field produced by the biasing magnet and (2) the transient field produced by the coil, causes the reed relay to close—thus operating the main tripping relay. While the described prior art interrupter is extremely important, it does have certain disadvantages which it would be desirable to eliminate. For example, when a permanent magnet is employed for biasing, it is exposed to the alternating current fields from the operating coil. This produces small magnetizing and demagnetizing effects in the permanent magnet which vary the sensitivity of the tripping function. Second, it is difficult to adjust the tripping sensitivity when utilizing a permanent magnet as this adjustment requires a change in the physical location of the magnet relative to the relay. Third, as the permanent magnet serves as a latch to hold the reed relay closed, some type of resetting means is required to open the reed relay contacts. Fourth, as the field of the permanent magnet is unidirectional but the field of the operating coil is bidirectional (A.C.), the reed relay will operate only on alternate half cycles. Accordingly, the speed of operation is limited.

SUMMARY OF THE INVENTION

It is a primary object of the present invention to provide improved biasing means for a reed relay. Other objects are to provide such a biasing means which is substantially unaffected by magnetic field changes in the operating coil, which is easily adjustable, which avoids the need for resetting the reed relay, and which permits faster operation of the reed relay.

The foregoing objects are achieved in accordance with the present invention by combining an electromagnetic biasing circuit with the reed relay. The reed relay includes an operating coil energizable from an alternating current source. The biasing means includes a coil in proximity to the reed relay which is energizable from the power supply.

BRIEF DESCRIPTION OF THE DRAWINGS

The manner in which the objects of this invention are achieved will be more apparent from the following description, the appended claims, and the figures of the attached drawings wherein:

FIG. 3 is a schematic illustration of a circuit embodying a modified form of this invention.

DESCRIPTION OF THE PREFERRED EMBODIMENTS

Figure 1:
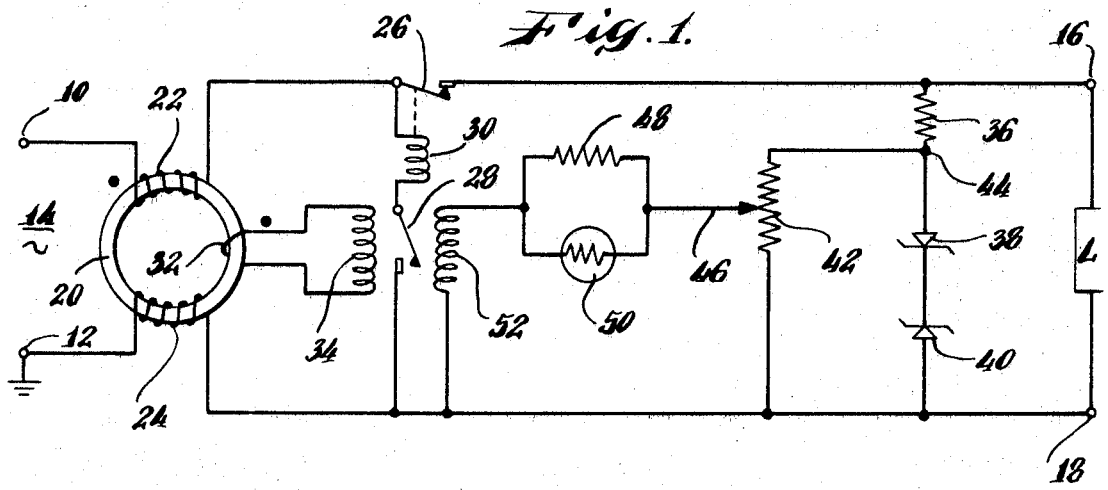
FIG. 1 is a schematic illustration of a circuit embodying this invention.

With particular reference to FIG. 1, there is illustrated a ground fault current interrupter employing electromagnetic biasing means in accordance with this invention. The interrupter includes input terminals 10, 12 which may be connected across a source 14 of alternating current power. The interrupter further includes output terminals 16, 18 which may be connected to a load L to be protected.

A toroidal magnetic core 20 is provided with a first primary winding 22 and a second primary winding 24. Primary winding 22 is connected in series with disconnect relay contacts 26 between input terminal 10 and output terminal 16. The second primary winding 24 is connected in series between input terminal 12 and output terminal 18. It will be noted from the diagram of FIG. 1 that primary winding 22 is in the "line" side of a two wire circuit and primary winding 24 is in the grounded "neutral" conductor. Connected across the output ends of the two primary windings is the series combination of a reed relay 28 and the operating coil 30 for the disconnect relay contacts 26. The core 20 is provided with a single turn secondary winding 32 which supplies an operating coil 34 placed in close proximity to the reed relay 28.

Connected in series across output terminals 16, 18 is a voltage clipping circuit comprising resistor 36 in series with reversed breakdown diodes 38, 40. A potentiometer 42 is connected across the diodes between connecting point 44 and terminal 18. The movable tap 46 of potentiometer 42 is connected in series with the parallel combination of a resistor 48 and a thermistor 50, the parallel combination being in series with a biasing field coil 52 connected to terminal 18.

The first primary winding 22 and the second primary winding 24 are so wound on core 20 that, when the current between input terminal 10 and output terminal 16 is equal to the current between output terminal 18 and input terminal 12, equal and opposite magnetic fields are produced in the core. Accordingly, there is no current induced in the secondary winding 32 and operating coil 34 remains deenergized. The operating coil 34 is placed in close proximity to the highly sensitive reed relay 28. When an unbalance does occur, the resultant field induces a magnetizing field in operating coil 34 and the magnetic field causes the reed relay 28 to close, thus energizing operating coil 30, opening the relay contacts 26 and disconnecting the load.

The power available in operating coil 34 to actuate the reed relay 28 is quite small at low values of ground fault current. For example, it is often desirabe to open relay contacts 26 when leakage to ground at the load end of the interrupter circuit is as little as 5 ma. For this reason, secondary biasing of the reed relay is required and is provided by means of the biasing field coil 52 which replaces the permanent magnet used in prior art devices.

Figure 2:
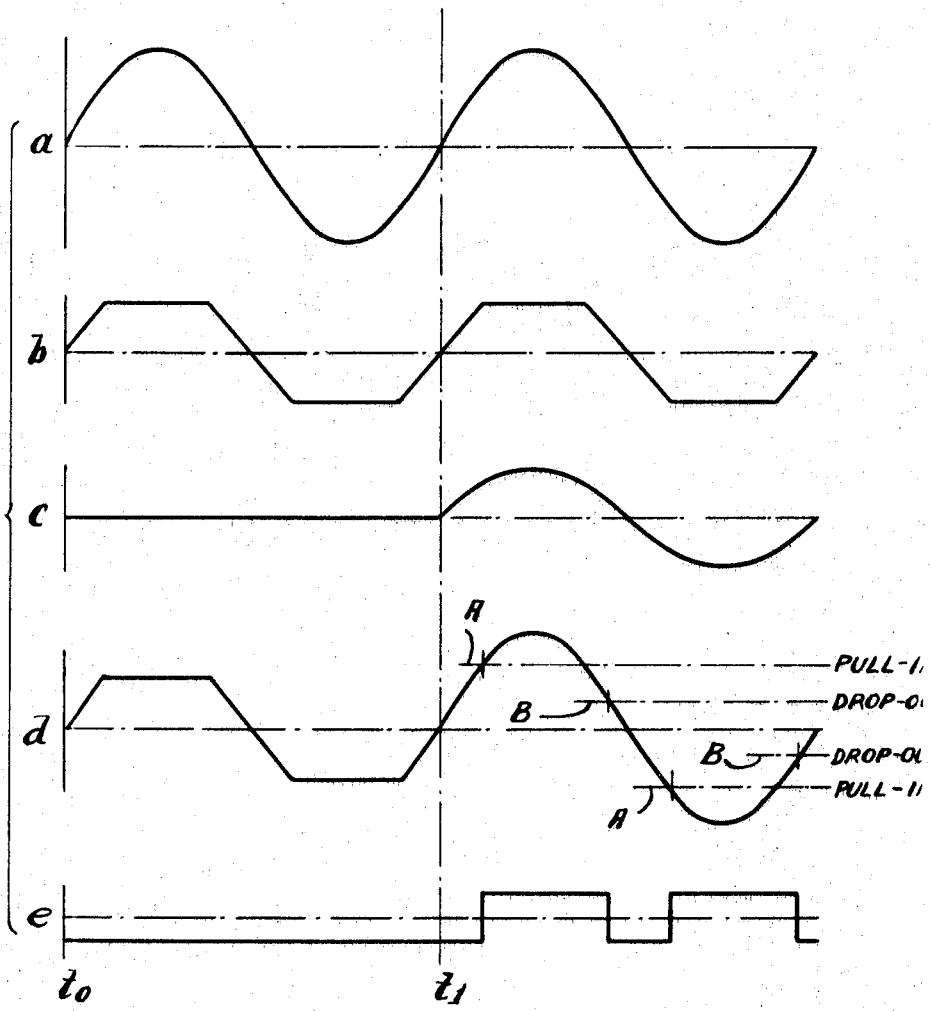
FIG. 2 (a–e) is a diagram of various wave forms illustrating the operation of the invention.

To fully understand the operation of the biasing means, reference is further had to FIG. 2. FIG. 2a illustrates the A.C. potential applied by source 14 across input terminals 10, 12. Under normal operating conditions, this is also the voltage appearing across output terminals 16, 18.

FIG. 2b illustrates the clipped voltage wave which appears across point 44 and terminal 18 as a result of the breakdown diodes 38, 40. The maximum and minimum potentials are established by the breakdown values of the diodes.

FIG. 2c illustrates the current flowing in secondary winding 32 and operating coil 34. In the period from time $t_0$ to $t_1$, normal operation is assumed. However, beginning at time $t_1$ a ground fault current of 5 ma. is assumed to exist, creating a resultant field in core 20 and a current flow in the operating coil 34 of approximately 40 ma. RMS.

Referring back to FIG. 2b it will be recalled that this represents the voltage across potentiometer 42. This is an adjustment potentiometer and a portion of this voltage is picked off by moving tap 46 to supply a current to biasing coil 52. The combination of resistor 48 and thermistor 50 compensate for any changes in resistance of the bias coil with temperature. Bias coil 52 has a positive temperature coefficient of resistance while the combination of resistor 48 and thermistor 50 has a negative temperature coefficient of resistance. The values of resistor 48 and themistor 50 are selected so that the total resistance of these elements and biasing coil 52 is constant over the normal temperature range. Therefore, the current flow through bias coil 52 will be substantially independent of temperature.

FIG. 2d illustrates the total magnetic field in the proximity of reed relay 28. From time $t_0$ to $t_1$ there is no leakage current and the current through the biasing winding, which is substantially proportional to the voltage illustrated in FIG. 2b establishes the illustrated field. Beginning at time $t_1$, however, the presence of a ground fault current superimposes upon this field, the field produced by the current of FIG. 2c flowing through operating coil 34. This gives a resultant field acting on the reed relay beginning at time $t_1$ as shown in FIG. 2d. The field required to close reed relay 28 is indicated as level "A" and the field strength at which the reed relay opens is indicated as level "B."

FIG. 2e illustrates the open and closed conditions of reed relay 28. The relay remains open until after time $t_1$. When the magnetic field illustrated in FIG. 2d exceeds level A, relay 28 closes. When these contacts close, current is caused to flow through the operating coil 30 and, after a sufficient period of time (approximately 8.0 ms.), contacts 26 will open, disconnecting power supply 14 from load L. The relay contacts 26 are mechanical latching and they remain open until manually reset. If the cause of the unbalance has been removed, contacts 26 may be closed and will remain closed.

The breakdown diodes 38, 40 should be matched so that their breakdown voltage is the same within approximately .10 volt. This assures that the reed relay will operate on each half cycle at the desired lower value of ground fault current. At larger values of fault current, matching of these diodes is not so important because the field is sufficiently large to cause reed relay 28 to operate on each half cycle in any event.

It will also be realized that the function of potentiometer 42 is to compensate for variations in the closing characteristics of reed relay 28 and for adjusting the relay so that it will close at the desired unbalance.

Although it will be understood by those skilled in the art that a number of variations and modifications may be made in the invention, the following circuit values have been found suitable in one application of the embodiment of FIG. 1:

$N_{22}$=20 turns
$N_{24}$=20 turns
$N_{32}$=1 turn
$N_{34}$=156 turns
$N_{52}$=3,000 turns
26= relay trip circuit breaker
$R_{48}$—150 ohms
$R_{36}$=3,500 ohms
$R_{42}$=1,000 ohms
$R_{50}$=607 ohms at 25° C.
Diodes 38, 40=7.5 volt Zener diodes
28=reed relay
20=high permeability tape wound core.

While the form of the invention so far described may be suitable for use in many applications, it will be noted that it requires proper connection with respect to the line and neutral sides of a power supply. Where additional safety is required such as, for example, in a portable cord connected version, it would be desirable for the circuit to be symmetrical. Such a circuit would not "know" the difference between the line and neutral sides, but would continue to function correctly regardless of the manner in which it was connected. Accordingly, there is illustrated in FIG. 3 a modified form of the invention which incorporates this additional advantage.

In many respects the circuit of FIG. 3 is similar to that of FIG. 1. Thus, it includes input terminals 54, 56 which may be connected across a source 58 of alternating current power. The interrupter further includes output terminals 60, 62 which may be connected to the load to be protected.

A toroidal magnetic core 64 is provided with a first primary winding 66 and a second primary winding 68. Connected across these windings are respective capacitors 70, 72 for bypassing transients which might otherwise cause false tripping. Primary winding 66 is connected in series with disconnect relay contacts 74 and with the contacts 76a, 76b of a relay 78 to output terminal 60. Contacts 80a, 80b of the relay 78 are connected in series with output terminal 62, with the contacts 82 of an overcurrent breaker 84, with the coil 86 of relay 84, and with second primary winding 68. The operating coil 88 of relay 78 is connected across relay contacts 76a, 80a. Connected across the circuit is the series combination of reed relay 90, a resistor 91, and the operating coil 92 for the disconnect relay contacts 74. The core 64 is provided with a single turn secondary winding 94 which supplies an operating coil 96 placed in close proximity to the reed relay 90. A full wave rectifier 98 and resistor 100 are connected in series across contacts 76a, 80a. Across the output of the rectifier 98 is a filter capacitor 102 and the series combination of current limiting resistor 104 and Zener diode 106. Zener diode 106 provides a 7 volt D.C. supply to a current limiting potentiometer 108 and the biasing field coil 110.

The modification illustrated in FIG. 3 includes certain safety features which might be found in a commercial device embodying the invention. For example, the operating coil 88 of relay 78 remains energized only when both the line and neutral conductors are electrically complete. Assuming, for example, that input terminal 56 is connected to the neutral side of the power supply and becomes disconnected, line voltage through the load would be present at terminal 62. This could create a shock hazard but, as coil 88 deenergizes, the relay opens both sides of the line. Furthermore, the overcurrent breaker 84 is designed to open upon a preselected current overload. With respect to the operation of biasing field coil 110 in connection with the reed relay 90, it will be seen that its operation is quite similar to that described in FIG. 1, with the exception that it is powered by a D.C. source, the strength of the biasing field being adjustable by potentiometer 108. This modification does not achieve the rapid response of the FIG. 1 circuit, as it operates on alternate half-cycles. However, it does provide the additional advantage of symmetry, the value of which has been previously discussed.

Other variations and modifications of this invention will be apparent to those skilled in the art. Accordingly, the foregoing description is to be construed as illustrative only, rather than limiting. This invention is limited only by the scope of the following claims.

What we claim as new and desire to secure by Letters Patent of the United States is:

1. A ground fault current interrupter circuit comprising: means responsive to current unbalance in the conductors supplying a load from a power supply to generate an operating current proportional thereto; a normally open magnetic reed relay having an operating coil connected to receive said operating current; circuit breaker means for disconnecting said load from said power supply upon closure of said reed relay; an electromagnetic biasing coil adjacent said reed relay; and biasing circuit means energized from said conductors on the load side of said circuit breaker and connected to supply biasing current to said biasing coil to establish a biasing magnetic field tending to close the contacts of said reed relay.

2. The circuit of claim 1 wherein said responsive means comprises a differential transformer having a plurality of primary windings, each connected in series with a conductor connecting said power supply to a load, and a secondary winding in series with said operating coil.

3. The circuit of claim 1 wherein said biasing circuit means includes adjusting means for selectively varying said biasing current.

4. The circuit of claim 3 wherein said adjusting means is a potentiometer.

5. The circuit of claim 1 wherein said biasing circuit means includes temperature compensation means.

6. The circuit of claim 5 wherein said temperature compensation means comprises means having a negative temperature coefficient of resistance connected in series with said biasing coil, said biasing coil having a positive temperature coefficient of resistance.

7. The circuit of claim 2 wherein said biasing circuit means includes adjusting means for selectively varying said biasing current.

8. The circuit of claim 2 wherein said biasing circuit means includes temperature compensation means.

9. The circuit of claim 1 wherein said biasing circuit means comprises full wave rectifier means.

10. The circuit of claim 2 wherein said biasing circuit means comprises full wave rectifier means.

11. The circuit of claim 10 wherein voltage stabilizing means is provided across the output of said rectifier means.

12. The circuit of claim 10 wherein said biasing circuit means includes adjusting means for selectively varying said biasing current.

13. A relay circuit comprising: a magnetic reed relay having an operating coil; means for energizing said operating coil from an A.C. power supply; an electromagnetic biasing coil adjacent said reed relay; and a voltage clipping circuit across said A.C. power supply, the clipped voltage produced thereby being applied to said biasing coil substantially in phase with said power supply.

14. The circuit of claim 13 wherein said energizing means comprises a differential transformer having a plurality of primary windings, each connected in series with a conductor connecting said A.C. power supply to a load, and a secondary winding in series with said operating coil.

References Cited

UNITED STATES PATENTS

| 3,365,618 | 1/1968 | Obenhaus | 317—41 |
| 3,376,477 | 4/1968 | Weinger | 317—155.5 X |

OTHER REFERENCES

T. D. Korange: Differential Control of a Reed Switch, November 1964, IBM Technical Disclosure Bulletin, vol. 7, No. 6, p. 496.

JAMES D. TRAMMELL, Primary Examiner

U.S. Cl. X.R.

317—27, 41, 155.5